April 11, 1939.  A. T. COLWELL ET AL  2,154,199
SEALING CONSTRUCTION
Filed June 1, 1936

INVENTORS.
ARCHIE T. COLWELL.
OTTO M. BURKHARDT.
BY
ATTORNEYS.

Patented Apr. 11, 1939

2,154,199

UNITED STATES PATENT OFFICE 2,154,199

SEALING CONSTRUCTION

Archie T. Colwell and Otto M. Burkhardt, Cleveland, Ohio, assignors to Thompson Products, Inc., Cleveland, Ohio Application June 1, 1936, Serial No. 82,987

4 Claims. (Cl. 286—7)

This invention relates to the art of packless water pumps and the like and comprehends an improved sealing means therefor and other features incident thereto.

The rotating shafts of water pumps and compressors are conventionally provided with packing glands to prevent leakage of fluid. Such packing glands are arranged around the shaft and held against its periphery and to the outside surface of the housing with pressure. The lapping of the gland material and the pressure soon cause abrasion of the shaft and hence additional pressure must frequently be applied to the gland material. Since this gland material is not homogeneous and therefore can not exert even pressure on the shaft, the resulting uneven pressure causes the shaft to actually run out of true and this causes bearing wear and soon renders the bearing inefficient.

The packing glands have to be placed on the outside of the housing of the pump or compressor in order that additional pressure may be applied from time to time and this necessitates in most cases that a bearing be located between the packing gland and the internal working parts of the pump or compressor. This bearing and the shaft within the same are then exposed to the working fluid which often is corrosive and in most cases dirty and hence abrasive.

To overcome the above-named defects has been in general the aim of inventors and manufacturers of packless pumps. Experience with such packless pumps, however, has revealed other serious defects. An outstanding difficulty has been that the seals which replace the packing glands squealed in operation, they wore rapidly and then caused leakage. This is more particularly true of the application of seals to water pumps as used with internal combustion engines and machine tools.

Briefly, the present invention embodies a principle whereby the bearings and seals are automatically lubricated from an intermediate reservoir for the purpose of reducing wear and squeal and leakage. The seals have been specifically selected and arranged to give the longest satisfactory life and there has also been incorporated a vibration dampener which was found to be essential to overcoming squeal and leakage.

Accordingly, one object of the present invention is to devise such a sealing construction in which the seal and bearing are automatically lubricated so as to reduce wear and squeal and also to contribute to the sealing effect.

Another object is to provide a specific combination of sealing elements which are selected, designed and arranged so as to co-operate in the accomplishment of the result desired and to give long life to the device; and more specifically to provide a seal in which there is effected automatically a ready and constant compensation for errors in manufacture of the parts; to provide a seal in which the materials thereof will withstand a high speed of revolution without wear and that are the least subject to corrosion by water; and to provide a seal with means to allow necessary clearance as might be occasioned by wear and without interfering with the sealing effect.

A further object is to include in the sealing combination a vibration dampener element to overcome the possibility of squeal and leakage, as will be explained.

Another object is to devise such a construction with a minimum total axial thickness of the sealing elements, for reasons to be later explained.

Another object is to provide a lubricant reservoir located between the seal and the bearing.

Another object is to provide an improved arrangement of the bearings.

Other objects will appear from the following description and claims when considered together with the accompanying drawing.

Figure 1:
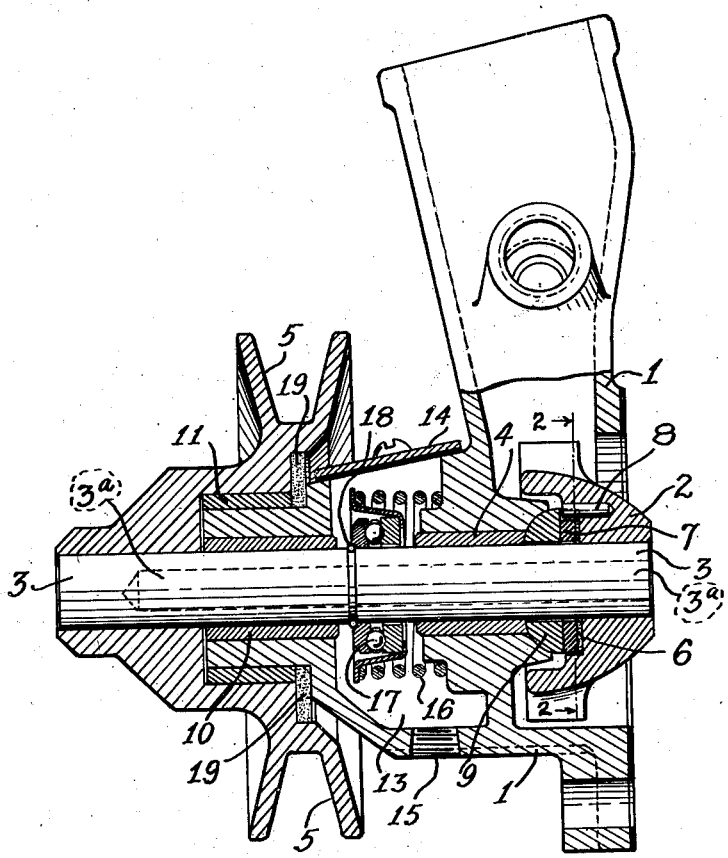
Fig. 1 is a vertical longitudinal sectional view of our improved device.
Figure 2:
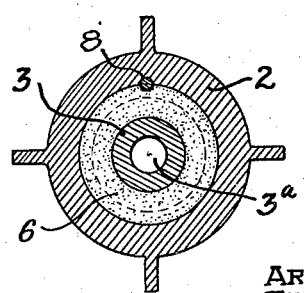
Fig. 2 is a sectional view taken upon line 2—2 of Fig. 1.

In devising the present invention, we have taken into account several important considerations regarding proper construction and efficient operation of a packless water pump, and the various requisites have all been satisfied in our present improved structure, as will be more fully explained after the details of the accompanying illustration have been described in order that reference may then be had thereto for a full understanding of the explanation to follow.

It is to be understood that the present particular disclosure is merely for purposes of illustration and that there might be devised various modifications without departing from the spirit of the present invention as hereinafter claimed.

The present invention is here illustrated in connection with a conventional water pump for an internal combustion engine. The cast iron casing will be recognized as being indicated by reference numeral 1 and the impeller therefor by reference numeral 2. The shaft 3 of the impeller has the bronze bushing 4 for bearing in the pump casing and has the operating pulley 5 provided upon the other end thereof and a bearing means at this point also for the shaft and pulley, as will be more fully explained.

First, there will be briefly described the seal construction at the impeller end of the shaft, then the bearing means adjacent the pulley and then the lubricant reservoir located between the seal and the bearing means just referred to; after which, there will be explained the practical considerations underlying these several features of our present invention.

The impeller body has a counterbored recess into which is inserted the flat washer 6 of cork. Adjacent to washer 6 there is placed the flat washer 7 of phenol formaldehyde compound. These two flat washers are glued, cemented or otherwise attached together so that the surfaces in contact will not permit leakage. The other flat surface of washer 6 is similarly sealed to the bottom surface of the recess in the impeller 2. The hermetic sealing of both flat surfaces of the cork washer does not interfere with its resilience and hence there is no interference with the vibration dampening action of the cork washer.

In order to prevent the sealed surfaces from being sheared loose by friction, torque pin 8 may be forced tightly into the impeller and fitted into a semi-cylindrical groove in the edge of the washers 6 and 7, whereby it will be ensured that these washers will revolve positively with the impeller. The cork washer 6 being resilient may fit tightly on shaft 3 and into the recess of the impeller 2. The washer 7 has clearance on shaft 3 as well as within the recess of the impeller 2.

The floating seal member is formed of "nitralloy" steel and is indicated by reference numeral 9. This seal member has a plain radially disposed face for engagement with the correspondingly formed surface provided upon the washer 7, while the other side of the seal member 9 is formed with a spherical face for engagement with the correspondingly formed surface provided upon the casing 1 and the bearing 4. The seal member 9 also has clearance with respect to shaft 3.

The percentage composition of "nitralloy" is as follows:

|  | Per cent |
| --- | --- |
| Carbon | .3 to .4 |
| Manganese | .4 to .6 |
| Silicon | .5 (max.) |
| Aluminum | .9 to 1.4 |
| Chromium | .75 to 1.5 |
| Molybdenum | .13 to .25 |
| Nickel | .25 (max.) |
| Phosphorus | .025 (max.) |
| Sulphur | .025 (max.) |

Remainder principally iron.

Briefly, such is the character of the seal construction which will be more fully explained below.

Referring briefly to the bearings 10 and 11, it will be observed that the bushing 10 for the shaft 3 and the bushing 11 for the pulley 5 are located the one within the other.

Located between the seal at the impeller end of the pump and the bearing at the other end, is the lubricant reservoir 13 which can be filled upon removal of the cover 14 or through nipple 15 and can be drained upon removal of the nipple 15. Within the reservoir are located the coil spring 16 and the ball thrust bearing 17. One race of this bearing abuts against the shaft 3 and turns with the same, as indicated by reference numeral 18. This turning serves to slightly agitate the lubricant and as the parts warm up, the grease expands a little and thus a small quantity of lubricant is forced into the bearings and also into the seal. The end thrust exerted by the ball bearing race on the shaft, by virtue of spring 16, serves to hold the sealing surfaces at all times in firm contact with each other.

We will now explain more fully the considerations by which we were governed in devising the present invention, reference being had to the accompanying form of illustration.

In a device of this character, it is imperative that the total axial dimension of the pump be held down to a minimum, and hence we have devised our seals so as to have a minimum total axial thickness and also we have provided the concentric arrangement of bearings at the pulley end of the device. Another consideration which enters into the matter of axial dimension of the seal combination, is the fact that the seal combination separates the impeller from the adjacent bearing, and such overhang virtually amounts to a lever arm for the amplification of any unbalanced forces due to rotation, thereby causing noise, wear of the bearings and consequently leakage of the seal.

The sealing combination must be of such character and arrangement as to automatically compensate for unavoidable errors in manufacture, this correction to be effected readily and with every revolution. For instance, in our construction, if the bottom face of the counterbore which receives the cork washer 6, should not be absolutely 90 degrees with the longitudinal axis of the shaft, or if the thickness of each washer 6 and 7 is not exactly even, then the floating washer 9 will, because of its spherical surface, oscillate within its spherical seat at an angle corresponding to the deviation of the vertical surfaces from being truly normal to the longitudinal axis of the shaft.

Another important factor is the automatic compensation for clearances without interfering with the sealing effect. For instance, the shaft must be mounted in its bearings with a certain amount of clearance which will necessarily increase with the running of the pump, due to wear. Then in order that there should be no interference with the free running of the shaft within the bearings and in order that the seal combination should not be required to resist radial loads, which should be solely the function of the bearings, we have provided the free radial sealing surfaces between the washer 7 and the floating washer 9 so as to permit radial displacements occasioned by bearing clearances and bearing wear, without interfering with the sealing characteristics of the combination.

It is also highly important that the sealing surfaces be smooth and remain smooth in service. In order to accomplish this, we had to find materials for the sealing members that would stand high revolution speed without appreciable wear or abrasion and at the same time be least corrosive to water and the common anti-freeze solutions. For instance, the spherical surface which is engaged by the spherical surface of the floating member 9, consists of the bronze of the bushing 4 and the cast iron of the casing 1. Both of these metals are excellent bearing surfaces when lubricated with oil or grease, which is herein provided. It will be observed that the spherical surfaces of the bushing 4 and casing 1 are located adjacent to the lubricant reservoir, and consequently the grease or oil will find its way from this reservoir along the shaft and bearing to this spherical surface. In our preferred combination, the floating member 9 is made of "nitralloy" steel which, for its extreme hardness, has remarkable resistance to corrosion. The extreme hardness of member 9 serves to maintain the combined surface of bushing 4 and casing 1 in proper spherical form and hence in proper condition for sealing effectively.

As a matter of fact, on account of its extreme hardness, the floating washer 9, as compared with the surfaces contacting the sides thereof, will wear very little and will thus maintain the adjacent surfaces of the other parts in proper shape and condition. This matter of relative hardness is of especial importance where rubbing speeds are high. Moreover, the presence of the floating washer 9 serves to reduce the rubbing speed between the impeller and the pump housing. Otherwise, the rubbing velocity of the sealing surfaces between the impeller and pump housing would be directly equal to the speed of revolution of the impeller. But this floating washer rotates approximately one-half impeller speed and thus the rubbing velocity between any two sealing surfaces is reduced to approximately one-half impeller speed. This insures longer life of the sealing surfaces.

It will be observed that the compound washer 7 is exposed to water and thus its particular composition is important with respect to wearing qualities under such condition.

The importance of the cork washer 6 will be appreciated when due consideration is given to the matter of vibrations and the danger of their being otherwise transmitted and magnified. Experience has proved that smooth sealing surfaces do not glide over each other smoothly but rather with the accompaniment of minute chatter. This phenomenon is analogous to that commonly observed when a finger tip is moved over a glass window pane. In a majority of water pumps for internal combustion engines, the fan is rigidly connected to the water pump shaft and, due to such rigid connection, the fan blades pick up the minute vibrations of the sealing members and magnify them to various pitches and noises in a manner quite similar to a tuning fork. It is therefore extremely important that the seal combination be free from vibration and furthermore that it be insulated from the pump shaft. In the present case, this is accomplished by the interposition of the cork washer 6 between the impeller end of the shaft and the seal combination. The washers 6 and 7 may be hermetically sealed together and to the impeller, and since such hermetic seal is resilient, by virtue of the cork washer, it will dampen vibrations. It is to be understood that this dampening effect will be obtained whether the washers 6 and 7 be sealed together or whether there be free engagement between their surfaces. Furthermore, it has been found that the inclusion of a resilient element in a seal combination will not only eliminate noise caused otherwise by vibration but also, because of the absence of vibrations, the sealing engagement between the elements is less apt to leak.

The matter of axial extension of the pump, as above referred to, will now be further considered especially in connection with the bearing arrangement adopted by us at the point of the driving pulley. Since the necessity of keeping down the axial extent of the pump often does not, under ordinary circumstances, permit of adequate bearing surfaces, we have adopted the concentric arrangement of bearings at the point of the pulley, in order to afford greater bearing surface for a given length of pump. We thus not only obtain greater bearing surface area, but in this way the bearing area is placed exactly where it is most needed, that is at the point where support for the driving pulley is needed. Whereas there is ordinarily one possible disadvantage in a concentric arrangement of bearings, namely the danger of the outer bearing, which is of course the larger in diameter, suffering from high rubbing speed, yet we have eliminated this possible danger by having the outer bushing floating. We have also precluded another danger or disadvantage that might otherwise result from this arrangement of bearings, namely the danger of the inner or smaller bearing not being able to dispose of its heat. This danger has been removed by drilling the shaft 3, as indicated by reference numeral 3ª, so as to provide water-cooling means and thereby keep the rubbing surface of the smaller bearing cool.

The intermediate lubricant reservoir constitutes another very important part of the present invention. This reservoir can be filled at intervals with grease and as it is introduced thereinto periodically under pressure through a suitable fitting, it can escape only through the bearings. The quantity of lubricant to be stored in the reservoir is sufficient to provide adequate and uniform lubrication over long periods of time. Free and undesirable escape of lubricant is prevented through the bearing at the point 4 because of the seal at this end of the pump, while any such escape of the lubricant at the other end of the pump is prevented by an efficient material 19 which is held firmly between the pulley and the pump housing.

The part which the lubricant plays in connection with the sealing of the pump against leaking, is also an important consideration. The presence of a fresh oil film in the bearings as well as between the sealing surfaces is a great aid also in preventing the pump from leaking. It is obvious that as the lubricant from the reservoir tends to flow outward, any drop of water that might have been wedged between the sealing surfaces, would have to overcome the resistance of the lubricating film before it could find its way to the grease reservoir. This greatly helps to keep pumps leak-proof even though by accident or otherwise the sealing surfaces are not 100 per cent leak-proof.

From the above it will be seen that in our invention the sealing surfaces have been so selected and arranged as to result in a minimum of rubbing velocity for any pair of surfaces, without increasing the number of surfaces beyond the minimum required for the positive universal action which is necessary in compensating for manufacturing errors, misalignment and wear. As above explained, this means longer life to the device and also economy in manufacture as well as several other advantages already mentioned, notably the elimination of squeal, wear and leaking. Still other advantages will readily suggest themselves to those who are familiar with the art to which this invention relates.

What we claim is:

1. In a sealing construction, the combination of a housing, a rotatable shaft member extending therethrough, a sealing means arranged between said housing and shaft member, said sealing means comprising a resilient vibration-dampening washer carried by the shaft member, a corrosion-resisting washer arranged adjacent said resilient washer so as to protect the same and having fixed rotative position with respect thereto and being free of said shaft member, and a comparatively hard washer arranged between said corrosion-resisting washer and the housing.

2. In a sealing construction, the combination of a housing, a rotatable shaft member extending therethrough, a sealing means arranged between said housing and shaft member, said sealing means comprising a flat cork washer secured in a depression in the shaft member, a flat washer of phenol-formaldehyde compound within the same depression and overlying and secured to said cork washer so as to protect the same and being free of said shaft member, and a floating washer of "nitralloy" steel having a plain face substantially normal to the longitudinal axis of the shaft member and engaging the said formaldehyde washer and having a spherical face engaging a correspondingly formed surface of the housing.

3. In a sealing construction, the combination of a housing, a rotatable shaft member extending therethrough, a sealing means arranged between said housing and shaft member, said sealing means comprising a flat cork washer secured to the shaft member, a flat washer of phenol formaldehyde compound within the same depression and overlying and secured to said cork washer so as to protect the same and being free of said shaft member, and a floating washer of "nitralloy" steel having a plain face substantially normal to the longitudinal axis of the shaft member and engaging the said formaldehyde washer and having a spherical face engaging a correspondingly formed surface of the housing, said housing being of cast iron and having a bronze bushing for the shaft, thereby affording a combined cast iron and bronze surface for engagement by said floating member.

4. In a sealing construction, the combination of a housing, a rotatable shaft member extending therethrough, a sealing means arranged between said housing and shaft member, said sealing means including a vibration-dampening washer secured to the shaft member, means for protecting said vibration-dampening washer, and a comparatively hard washer arranged in a floating manner between said protecting means and the housing, said hard washer and protecting means being free of engagement with said shaft member, and said sealing means having all sealing surfaces angularly disposed with respect to the longitudinal axis of the shaft member.

ARCHIE T. COLWELL.
OTTO M. BURKHARDT.